United States Patent [19]
Wai

[11] Patent Number: 5,496,602
[45] Date of Patent: Mar. 5, 1996

[54] LOW RESIN CONTENT UNIDIRECTIONAL FIBER TAPE

[75] Inventor: Martin P. Wai, Cheshire, Conn.

[73] Assignee: DOW-United Technologies Composite Products, Inc., Wallingford, Conn.

[21] Appl. No.: 343,767

[22] Filed: Nov. 22, 1994

[51] Int. Cl.⁶ ............................. A61F 13/02; D04H 3/02
[52] U.S. Cl. ............................ 428/40; 428/294; 428/902
[58] Field of Search ............................. 428/294, 40, 902

[56] References Cited

U.S. PATENT DOCUMENTS

| | | | |
|---|---|---|---|
| 3,700,536 | 10/1972 | Bentvelzen et al. | 428/294 |
| 3,707,433 | 12/1972 | Clough et al. | 428/294 |
| 3,779,851 | 12/1973 | Hertz. | |
| 4,073,670 | 2/1978 | Mitra. | |
| 4,131,502 | 12/1978 | Mitra. | |
| 4,390,575 | 5/1983 | Kopp | 428/294 |
| 4,409,274 | 10/1983 | Chaplin et al.. | |
| 4,571,355 | 2/1986 | Elrod. | |
| 4,608,426 | 8/1986 | Stern. | |
| 4,894,281 | 1/1990 | Yagi et al.. | |
| 5,057,353 | 10/1991 | Maranci et al.. | |
| 5,204,033 | 4/1993 | Pearce et al.. | |

*Primary Examiner*—James D. Withers
*Attorney, Agent, or Firm*—McAulay Fisher Nissen Goldberg & Kiel

[57] ABSTRACT

A low resin content unidirectional fiber tape is disclosed for use in incorporating unidirectional fibers in dry fiber preform for use in a resin transfer molding process. A plurality of unidirectional fibers are located between a pair of thin flexible resin films which hold the fibers together without significant infiltration into the fibers. The films also have sufficient adhesiveness to maintain contact with a release layer but are not so adhesive that they do not prevent removal of the unidirectional tape with hand pressure. Preferably the total resin content of the films is from 1% to 20%, preferably 3% to 15% by weight relative to the total resin and fiber weight. At such a level, the tape is capable of being handled by a preform assembler and draped over contoured surfaces without distortion or separation of the unidirectional fibers. In addition, the low resin content allows for later infiltration of an injection resin into the interstices between the fibers, for full integration of the unidirectional fibers into the ultimate part.

11 Claims, 2 Drawing Sheets

LOW RESIN CONTENT UNIDIRECTIONAL FIBER TAPE

TECHNICAL FIELD

This invention relates to the assembly of a shaped dry fiber preform for use in a resin transfer molding process and more particularly to a low resin content unidirectional fiber tape which can be handled and is drapable for use in the assembly of a shaped preform.

BACKGROUND

In the fabrication of a composite article, it is typical to assemble a plurality of orientated dry fiber layers into a shape to match the shape of the article. This assembly of dry fiber layers is known as a "preform" which may subsequently be placed in a mold. Resin is then injected into the mold to infiltrate between the fibers, to fill out the composite part. This process for producing composite parts is known as "resin transfer molding" (RTM).

In such a process, it is difficult to incorporate a layer of unidirectional fibers, because there is no way to maintain dry unidirectional fibers in register during preform assembly. It is also difficult to place the fibers in a preform because of the tendency to separate. Even if one were to successfully place a layer of dry unidirectional fibers in the preform, it is likely that during resin injection, the fibers will separate and shift, thus reducing part strength, and making it difficult to maintain part to part consistency.

To overcome this problem, a preimpregnated unidirectional fiber tape was used which has a resin content of about 35% by weight. While sufficient to hold the fibers together, this tape failed to allow resin infiltration, and a boundary layer formed between the tape and the adjacent plys. This is unacceptable, as it provides a site for possible delamination and part failure. Consequently, the search continues for a unidirectional fiber tape which is drapable and handleable for adapting to the shape of the preform, provides sufficient cohesiveness to prevent fiber separation and additionally allows full resin infiltration during resin injection.

SUMMARY OF THE INVENTION

These and other objects of the present invention are achieved by a unidirectional fiber tape comprising a plurality of unidirectional fibers arranged in a layer and a pair of thin flexible films formed of a resin present in an amount sufficient to maintain the fibers in register but below an amount which would significantly inhibit resin infiltration. The films are placed above and below the plurality of fibers, to sandwich the fibers therebetween. The films do not substantially infiltrate into the interstices between the fibers, holding the fibers through surface contact with some penetration.

Preferably, a plurality of unidirectional fibers are placed between a pair of resin films, to provide a tape having a total resin content of about 1% to 20% by weight, preferably 3% to 15% by weight relative to the total weight of resin and fiber. At such a level, the tape is capable of being handled and draped over shaped contoured surfaces, to conform to the preform without significant fiber shifting. At such levels, the film does not inhibit resin infiltration, but melts and commingles with the injection resin to assure full integration of the unidirectional fibers into the part. Above about 20%, infiltration is inhibited and below 1%, there is insufficient cohesion to hold the fibers together. The term "film" as used herein means a continuous and uniform layer of flexible compatible resin material.

DETAILED DESCRIPTION OF THE INVENTION

Figure 1:
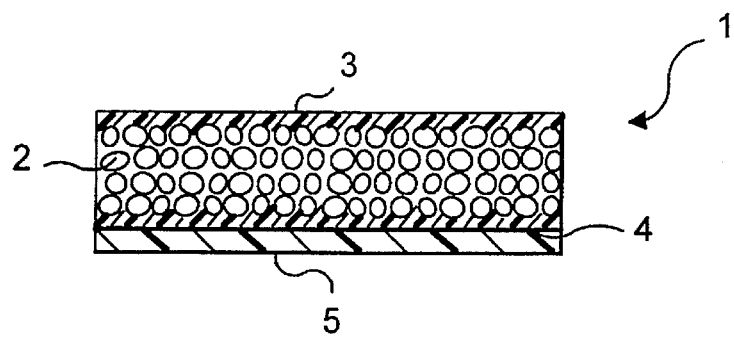
FIG. 1 is a cross sectional view of the tape of the present invention.

Referring to FIG. 1, a unidirectional fiber tape 1 produced according to the present invention comprises a plurality of fibers 2 placed in a substantially parallel orientation having an upper film 3 and a lower film 4 which maintain the fibers in their parallel or unidirectional orientation. The lower film rests on a release layer 5. The film must have sufficient adhesion to the release layer to allow shaping of the tape to a particular contour, but be releasible from the release layer using hand pressure without causing damage to the film or separation of the fibers.

The thin, flexible film must also have sufficient cohesion to allow cutting of the tape, placement of the tape in a preform assembly and removal of the release layer without disturbing the unidirectional fiber orientation, yet the amount of resin used must be minimized to promote resin infiltration into the interstices between the fibers during injection.

Each film is formed of a resin which is compatible with the selected injection resin. For example, an epoxy resin may be used provided it is formulated to provide a thin flexible film at about room temperatures, and that it is softenable at moderate temperature increases, without undergoing substantial premature curing. Of course, other film forming resins may be used. Other suitable resins include polyamide, particularly bismalesmide resins, polycyanate ester resins, vinyl ester resins, benzocyclobutene resins, etc.

Examples of suitable resin and hardener mixtures includes a mix of epoxy resin such as Tactix 123 epoxy resin made by Dow Chemical Company or PR 500 manufactured by 3M, as each is capable of forming a film. Preferably, if PR 500 is used, it may be blended with another resin such as PT 500 epoxy resin also manufactured by 3M. The PT 500 resin assists in adjusting the adhesiveness of the film and can be varied according to need. For example, an 80/20 mixture of PR 500/PT 500 has been used. Another resin useable for forming the films is 1, 1'-MDA bismaleimide (BMI) resin, known within the field as 5250-4 RTM BMI resin manufactured by Cytec Chemical Co.

These are exemplary film forming resins which are useful since many components are produced utilizing either epoxy resin or BMI resin and therefore these are compatible in those systems. However, other resins can easily be identified by one skilled in the art for use with specific resin systems and the invention is not limited to those discussed herein.

The resin content of the tape must be in the range of 1% to 20% by weight, relative to the total weight of the fiber and resin. The term "resin content" as used herein refers to the total weight of the fiber and resin. Above 20% resin content, resin infiltration may be inhibited and under 1%, the fibers may fail to maintain their orientation. Preferably 3% to 18% resin content is used and from 7% to 14% resin content is most preferred. For example, a pair of films, each having a thickness on the order of about 10–14 g/m² for a fiber areal weight of 228 g/m² may be used.

An important consideration is that the films are combined with the fibers such that there is limited penetration of the resin film into the unidirectional fibers. Thus, there is no substantial resin intermingled with the fibers, other than at the upper and lower surfaces. This enhances the ability of the later injected resin to infiltrate the interstices between the fibers while enhancing tape flexibility for conformance to complex shapes.

Figure 2:
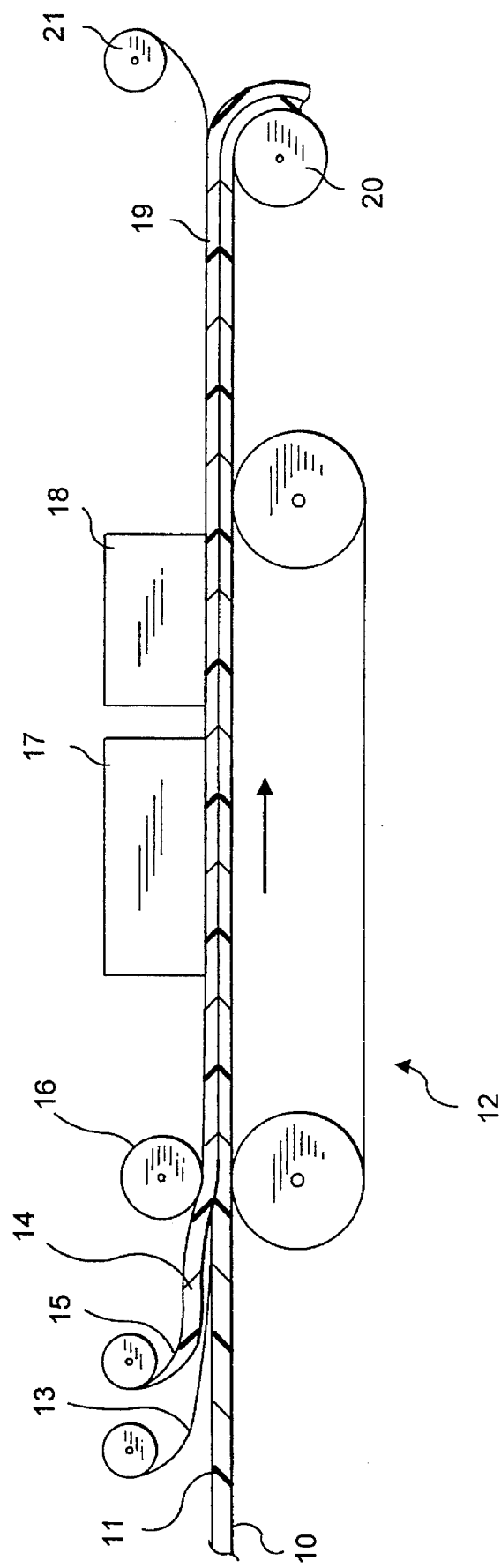
FIG. 2 is an illustrative view of the method for forming the tape of the present invention.

Referring to FIG. 2, the production of the inventive tape is illustrated. A release layer 10 has a resin film 11 applied to it in sheet form. Various materials are available commercially to perform as the release layer. For example, a MYLAR™ backing available from 3M Company may be used. The film 11 may be formed utilizing various techniques known in the art. For example, the resin film can be made by casting onto release paper at elevated temperature and spread between nip rolls with subsequent cooling.

Of course, the films may be formed as an integral step in the tape manufacturing sequence, or they may be formed separately and stored on a roll and used as needed.

The release layer 10 and resin film 11 are fed to a conveyor 12 where the plurality of continuous fibers 13 are placed on top of the film. A second film assembly 14, formed in the same manner as the first film and having a integral release layer 15, is applied over the fibers, and the films and fibers are then brought into contact as they pass beneath a roller 16. This roller may be heated to begin softening the film. The assembled films and fibers then pass through a heating section 17, operated at a temperature sufficient to soften but not melt the films. Temperature of about 140° to 250° F. may be used, depending on the film composition. Should the resin melt, the film due to its thinness would lose cohesiveness and uniformity and fiber separation would occur. This softening allows the surface fibers to become partially imbedded in the film without significant film penetration beyond the surface fibers. It has been found that below about 140°, the fibers will not stick to the film and separation may occur. It may be preferable to provide further compaction at this stage, though this depends on the tape being constructed.

The sandwiched assembly then passes through a cooling section 18, cooled to about room temperature or below, to stiffen the films and adhere the surface fibers to the films, forming a tape 19, which is then rolled onto a spool 20 for storage, preferably in an area where the temperature is maintained below room temperature. Another spool 21 is used to collect the release layer 15 from the assembly film roll 14, and saved for reuse. To use the tape, a portion is taken off the spool 19, cut and the cut section placed onto a shaped surface of a preform.

It is understood, of course, that this is one way of making this tape, and that other methods could be used. For example, solvent casting on release paper, film casting on release paper, etc., using a curtain coating technique may be used.

Figure 3:
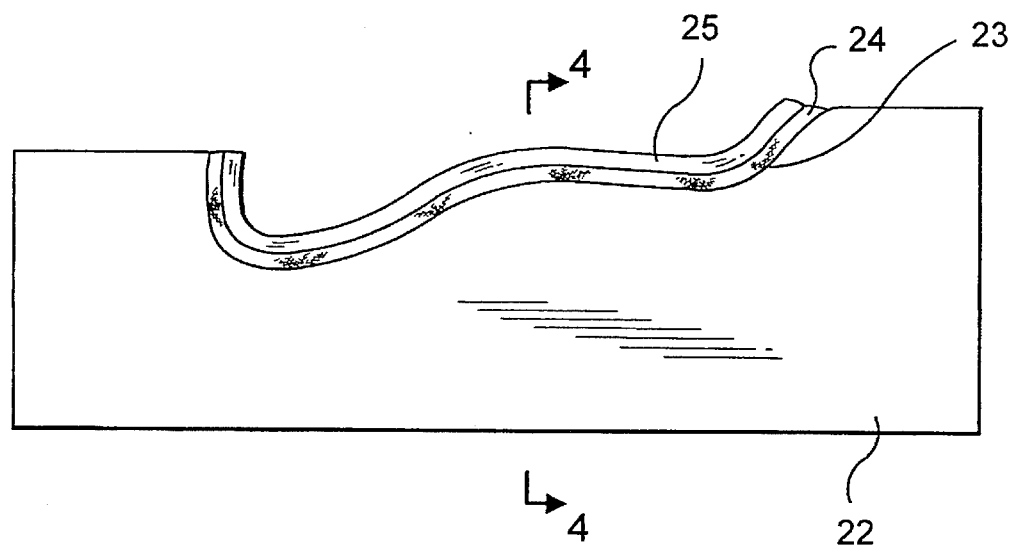
FIG. 3 is a view showing the incorporation of the tape of the invention within a preform.

Referring to FIG. 3, a preforming tool 22, has a shaped surface 23 upon which a fabric layer 24 has been placed. A unidirectional fiber tape 25 has been placed on the upper surface of the layer 24 and conformed to the shaped surface, the release layer having been peeled off and discarded. This leaves only the fibers and film on the surface of the fabric layer.

Figure 4:
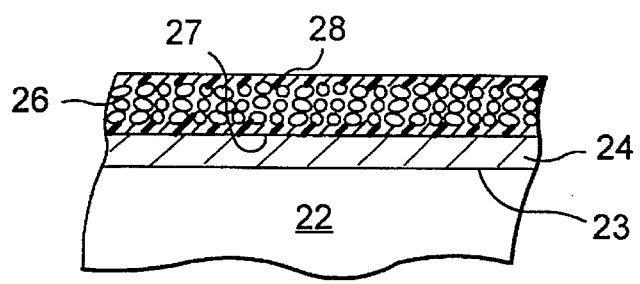
FIG. 4 is a view taken along line 4—4 of FIG. 3, showing the combination of the unidirectional fiber tape with a fiber ply.

Referring to FIG. 4, a cross sectional view shows a plurality of unidirectional fibers 26 located above the fabric layer 24, in a uniform distribution between a pair of films 27 and 28 establishing that separation has not occurred.

The tape produced according to the invention has sufficient stability, despite its low resin content, to be handleable and drapable prior to incorporation in preform.

A unidirectional fiber tape was produced using graphite fibers having a fiber areal weight (FAW) of about 228 g/m² and upper and lower films composed of a resin bend of 80% PR500/20% PT500 epoxy, used at about 10% to 12% by weight resin content. The tape was twelve inches wide and was determined to yield a laminate fiber volume of 55% at a cured per ply thickness of 8.3 mil after resin injection. The tape had excellent tack and drape for handling and lay up purposes. After incorporation into a preform, the unidirectional fibers became fully integrated into the structure during molding and cure. No significant fiber displacement occurred during resin injection, nor did a boundary layer form in the molded part.

A unidirectional fiber tape was produced using graphite fibers having a fiber areal weight of about 228 g/m$_2$ and upper and lower films composed of 5250-4 RTM Bismaleimide resin, used at about 10% to 12% by weight resin content. The tape was twelve inches wide. The tape had excellent tack and drape and was easily handled by an operator who placed the tape into a preform. No significant displacement occurred during resin injection and the unidirectional fibers became fully integrated into the structure.

The tape could be produced with essentially any fiber, such as glass, aramid, graphite, etc. Also the size and density of fibers can be varied accordingly, so long as the proper resin content ratio by weight is maintained. Utilizing the tape of the invention, preforms can be readily produced which incorporate unidirectional fibers without fiber separation and distortion.

While preferred embodiments of the present invention have been shown and described, it will be understood by those skilled in the art that various changes and modification could be used without varying from the scope of the present invention.

We claim:

1. A unidirectional fiber tape comprising a plurality of unidirectional fibers, a pair of thin, flexible films disposed on opposite sides of the fibers, the films formed of a resin present in an amount sufficient to maintain the fibers in register but below an amount which would significantly inhibit resin infiltration, the resin amount being from about 1 to 20 percent by weight based on the total weight of the tape.

2. The fiber tape of claim 1 wherein the thin, flexible films are softenable to allow partial embedment of the unidirectional fibers into the films.

3. The fiber tape of claim 1 further comprising a release layer located adjacent to one of the pair of films.

4. The fiber tape of claim 3 wherein the thin, flexible films have sufficient adhesiveness to maintain attachment to the release layer.

5. The fiber tape of claim 1 wherein the thin, flexible films are present in an amount of from about 3% to 18% by weight based on the total weight of the tape.

6. The fiber tape of claim 1 wherein the thin, flexible films are present in an amount of from about 7% to 14% by weight based on the total weight of the tape.

7. The fiber tape of claim 1 wherein the fibers are made of a material from the group consisting of glass, aramid, graphite and combination thereof.

8. The fiber tape of claim 1 wherein the resin material is from the group consisting of epoxy, polyamide, polycyanate ester, vinyl ester, benzocyclobutene resins and combinations thereof.

9. The fiber tape of claim 1 wherein the resin material comprises at least one bismaleimide resin.

10. The fiber tape of claim 1 wherein the resin material comprises at least one epoxy resin.

11. The fiber tape of claim 3 wherein the release layer is formed of MYLAR™.

* * * * *